United States Patent [19]

Burnham et al.

[11] Patent Number: 5,173,726
[45] Date of Patent: Dec. 22, 1992

[54] AUTOMATIC PARALLAX CORRECTION IN DEPLOYING LENS CAMERA

[75] Inventors: William L. Burnham; Richard A. Gates, both of County of Monroe, N.Y.

[73] Assignee: Eastman Kodak Company, Rochester, N.Y.

[21] Appl. No.: 710,274

[22] Filed: Jun. 4, 1991

[51] Int. Cl.$^5$ .......................................... G03B 17/04
[52] U.S. Cl. ................................................... 354/187
[58] Field of Search ............... 354/187, 188, 189, 190, 354/191, 192, 193, 194, 221, 288

[56] References Cited

U.S. PATENT DOCUMENTS

| | | | |
|---|---|---|---|
| 570,774 | 11/1896 | Sanderson | 354/190 |
| 2,062,585 | 12/1936 | Laube et al. | 354/221 X |
| 2,302,584 | 11/1942 | Steiner | 354/221 X |
| 2,552,244 | 5/1951 | White | 354/221 X |
| 2,674,932 | 4/1954 | Tydings et al. | 354/295 X |
| 2,719,454 | 10/1955 | Nerwin | 354/221 |
| 2,730,024 | 1/1956 | Merrick | 354/295 X |
| 4,079,399 | 3/1978 | Hopfner | 354/221 |
| 4,184,759 | 1/1980 | Ito et al. | 354/187 X |
| 4,326,783 | 4/1982 | Kawanura et al. | 354/402 |
| 4,894,672 | 1/1990 | Tanaka | 354/195.12 |

FOREIGN PATENT DOCUMENTS 2-051134  2/1990  Japan .

Primary Examiner—Michael L. Gellner
Assistant Examiner—Howard B. Blankenship
Attorney, Agent, or Firm—Lawrence P. Trapani

[57] ABSTRACT

A camera which comprises a camera housing, containing a viewfinder system and a back wall. The camera further comprises a deployable objective lens, having an optical axis that is substantially normal to the back wall of the camera housing throughout lens deployment. The objective lens is spaced apart from the viewfinder system in at least a lateral dimension and from the back wall in at least a forward dimension. A deployment assembly, supported by the camera housing, deploys the objective lens between a compact storage position and a range of operational focus positions. The deployment assembly is positioned, configured and dimensioned to produce an arcuate deployment path that approximates a theoretical lens path, for simultaneous parallax correction and focus adjustment, between an infinity focus position and a near focus position. The deployment assembly includes a carriage, to whcih the objective lens is mounted. The carriage has a first side and an opposite side separated by a transverse dimension. The carriage is supported by the camera housing by means of front and rear support links, having equal lengths. Each support link is pivotally connected to the camera housing at a proximal end, and to the front side of the carriage at a distal end. The rear support link is spaced apart from the front support link by a predetermined bearing distance in the forward dimension. The arcuate deployment path, produced by the deployment assembly, has a radius of curavature equal to the length of the support links.

18 Claims, 4 Drawing Sheets

AUTOMATIC PARALLAX CORRECTION IN DEPLOYING LENS CAMERA

BACKGROUND OF THE INVENTION

1. Technical Field

The present invention relates generally to cameras and, more particularly, to deploying lens cameras having automatic focus and parallax correction capability.

2. Background Art

In a conventional autofocus camera, the viewfinder is stationary and the taking or objective lens is movable in either direction along a straight-line path (optical axis) which is generally perpendicular to the film plane. Some cameras, such as the Konica A4, have a deploying objective lens, where the lens is stored in the body of the camera and deployed straight out along the optical axis to its focus or operational positions. Deployment of the objective lens from its stored position is achieved by slidably engaging a lens housing or support (containing the lens) onto a pair of guide rods, as in the Konica A4 camera, or as disclosed in U.S. Pat. No. 2,552,244 to White.

This arrangement has a substantial drawback in that the deployment distance is limited by the length of the guide rods which is, in turn, limited by the depth requirement of the camera housing. Further, the deployment distance is limited by any bearing assembly (e.g., a bushing or sleeve pair) engaging the guide rods. An effort to maximize the deployment distance by shortening the length of the bearing assembly is limited by stability considerations of the objective lens.

In another known configuration, lens deployment is achieved by means of extendable/retractable X-shaped linkages, as disclosed in U.S. Pat. No. 4,894,672 to Tanaka an U.S. Pat. No. 4,326,783 to Kawamura et al. This configuration suffers from the inherent problems associated with a design having a large number of moving parts, including relatively low reliability and high manufacturing cost. The intricate assembly also limits efforts to minimize the depth dimension of the camera housing.

In conventional autofocus and manual focus cameras, parallax correction becomes necessary for near field focus positions. In such cameras, the optical axes of the viewfinder and that of the objective lens are parallel to each other and separated by some interaxial distance. As a result, for relatively close object focusing, the position of the object image as seen in the viewfinder will not coincide with the position of the object image that is focused onto the film by the objective lens.

In one known method, the user performs parallax correction by selecting the position of the viewfinder, relative to the object, with the aid of auxiliary lines in the viewfinder and by judging the distance of the object. For the ordinary user, this correction method is both difficult to understand and to perform.

Other known approaches to parallax correction include the adjustment of the image scene through the viewfinder by movement of viewfinder frame elements as disclosed in U.S. Pat. Nos. 4,079,399 to Hopfner, 2,719,454 to Nerwin, and 2,302,584 to Steiner, or by insertion of optical prism elements in the viewfinder as disclosed in U.S. Pat. Nos. 2,730,024 to Merrick and 2,674,932 to Tydings et al. These approaches are less than optimum for autofocus cameras because the viewfinder field of view must be adjusted to match the field of view of the taking lens. Thus, the composition of the picture must occur after the camera is focused, requiring an additional delay in the taking of a picture.

A further approach to parallax correction includes movement of the viewfinder lens along a straight path, inclined relative to the optical axis of the objective lens, as disclosed in U.S. Pat. No. 2,062,585 to Laube et al. Alternatively, the objective lens has been made to move along a straight path, inclined to the optical axis of the viewfinder, as disclosed in Japanese Pat. 2,051,134 (1990). These approaches have required the use of extended guide rods upon which the lens is made to travel. Hence, they are not suitable for compact camera designs where it is desirable to retract the objective lens from its operational positions to a compact storage position.

SUMMARY OF THE INVENTION

It is therefore an object of the present invention to provide a camera having a simple and compact lens deployment assembly that avoids the problems associated with the prior art.

It is another object of the present invention to provide a compact camera having a deployment assembly that will deploy an objective lens of the camera between an extended operational position and a compact storage position.

It is a further object of the present invention to provide a camera having a single deployment assembly for the: (1) deployment of an objective lens of the camera between a stored position and an operational position; (2) autofocus adjustment of the objective lens over a wide range of focus positions; and (3) automatic correction of parallax between a viewfinder of the camera and the objective lens.

It is yet another object of the present invention to provide a camera having a deployment assembly that deploys an objective lens of the camera through automatic focus adjustment and parallax correction simultaneously.

It is yet a further object of the present invention to provide a camera having a simple deployment assembly with very few moving parts, and thus improved reliability and reduced manufacturing cost.

It is still another object of the present invention to provide a camera having a deployment assembly by which the deployment distance produced is not limited by the depth dimension of the camera housing.

These and other objects are attained in accordance with the present invention wherein there is provided a camera which comprises a camera housing, containing a viewfinder system and a back wall. The camera further comprises a deployable objective lens, having an optical axis that is substantially normal to the back wall of the camera housing throughout lens deployment. The objective lens is spaced apart from the viewfinder system in at least a lateral dimension and from the back wall in at least a forward dimension.

A deployment assembly, supported by the camera housing, deploys the objective lens between a compact storage position and a range of operational focus positions. The deployment assembly is positioned, configured and dimensioned to produce an arcuate deployment path that approximates a theoretical lens path, for simultaneous parallax correction and focus adjustment, between an infinity focus position and a near focus position.

The deployment assembly includes a carriage, to which the objective lens is mounted. The carriage has a first side and an opposite side separated by a transverse dimension. The carriage is supported by the camera housing by means of front and rear support links, having equal lengths. Each support link is pivotally connected to the camera housing at a proximal end, and to the front side of the carriage at a distal end. The rear support link is spaced apart from the front support link by a predetermined bearing distance in the forward dimension. The arcuate deployment path, produced by the deployment assembly, has a radius of curvature equal to the length of the support links.

The deployment assembly is actuated by a deployment motor which is coupled to the rear support link through a worm gear transmission. A control circuit controls the deployment motor in response to inputs received from a range finder.

BRIEF DESCRIPTION OF THE DRAWINGS

Further objects of the present invention together with additional features contributing thereto and advantages accruing therefrom will be apparent from the following description of the preferred embodiment which is shown in the accompanying drawings, in which.

DESCRIPTION OF THE PREFERRED EMBODIMENT

Figure 1:
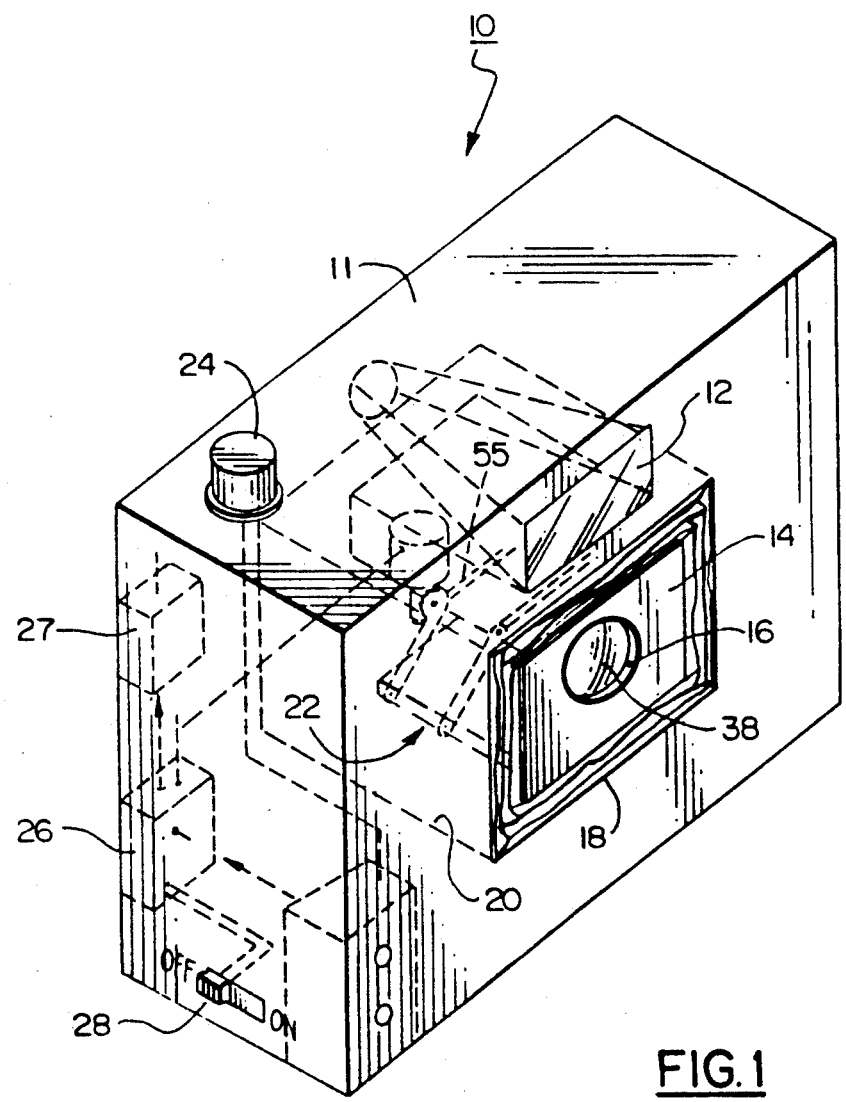
FIG. 1 is a front perspective view of a schematic representation of a deploying lens camera, embodying the teachings of the present invention.

Referring to FIG. 1 of the drawings, there is shown a deploying lens camera 10 having a camera housing 11. Camera housing 11 contains a fixed viewfinder optical system 12, a lens-shutter mount 14, and an objective lens contained in a barrel 16. A contractible bellows seal 18 connects to camera housing 11 and to lens-shutter mount 14 for external light shielding of camera housing 11. Contained within camera housing 11 is a storage compartment 20 that is configured and dimensioned to store an objective lens deployment assembly 22. Lens-shutter mount 14 forms part of deployment assembly 22. Deployment assembly 22 is configured to deploy lens-shutter mount 14 between a compact storage position located in storage compartment 20 and a number of operational focus positions located outside storage compartment 20, as more fully described herein below Bellows seal 18 extends and contracts in accordance with the deployment of assembly 22. As an alternative to bellows seal 18, a labyrinth or wiper seal may be used.

With further reference to FIG. 1, there is shown a shutter release button 24 which activates a range finder 25 contained in camera housing 11. Range information generated by range finder 25 is received by a motor control circuit 26. Motor control circuit 26 controls the deployment of deployment assembly 22 as described herein below. Motor control circuit 26 determines when deployment assembly 22 is in the proper focus position and generates a signal to this effect. This signal is received by a shutter drive circuit 27. Shutter drive circuit 27 provides a means for actuating a shutter mechanism (not shown) of camera 10, as described herein below. An ON/OFF switch 28 is provided at a side wall of camera housing 11. Switch 28 is used to connect a power supply to the various circuitry contained in camera housing 11, as described with reference to FIG. 2 below.

In operation, the objective lens, by means of deployment assembly 22, tracks a target centered in fixed viewfinder 12, as the objective lens is being focused. The tracking is performed by the same assembly 22 that deploys the objective lens from compact storage compartment 20.

Figure 2:
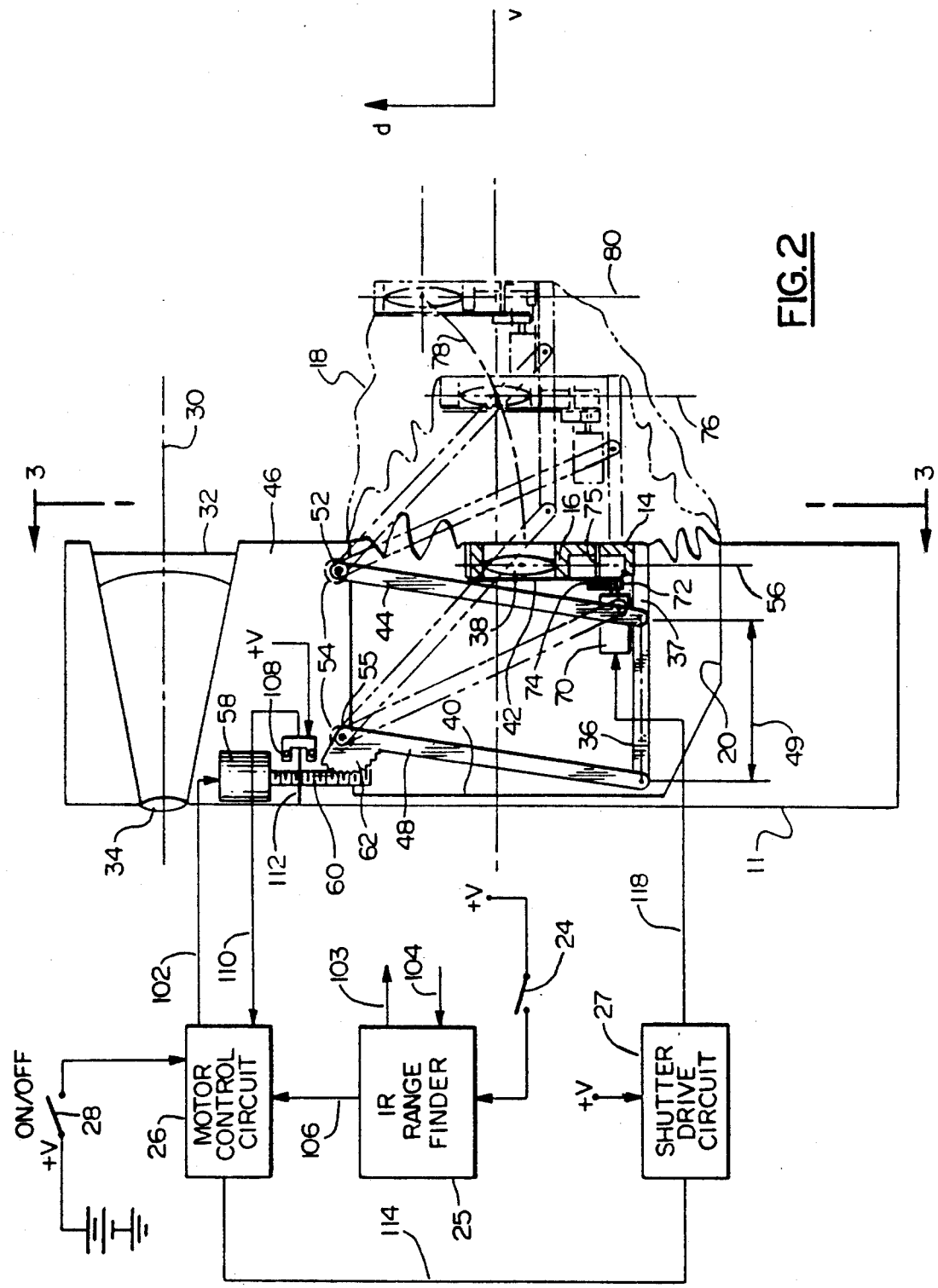
FIG. 2 is an enlarged cross-sectional view of the deploying lens camera shown in FIG. 1, including the deployment assembly shown in a storage position (solid lines) and in two operational positions (phantom lines)

A vertical cross-sectional view of the preferred embodiment is shown schematically in FIG. 2. Viewfinder system 12 contains a defined optical axis 30. As shown in FIG. 2, viewfinder system 12 is a reverse Galilean viewfinder, the construction of which is well known in the camera art. It includes a glass or plastic rectangular negative lens 32 and a glass or plastic eye-piece lens 34.

Figure 3:
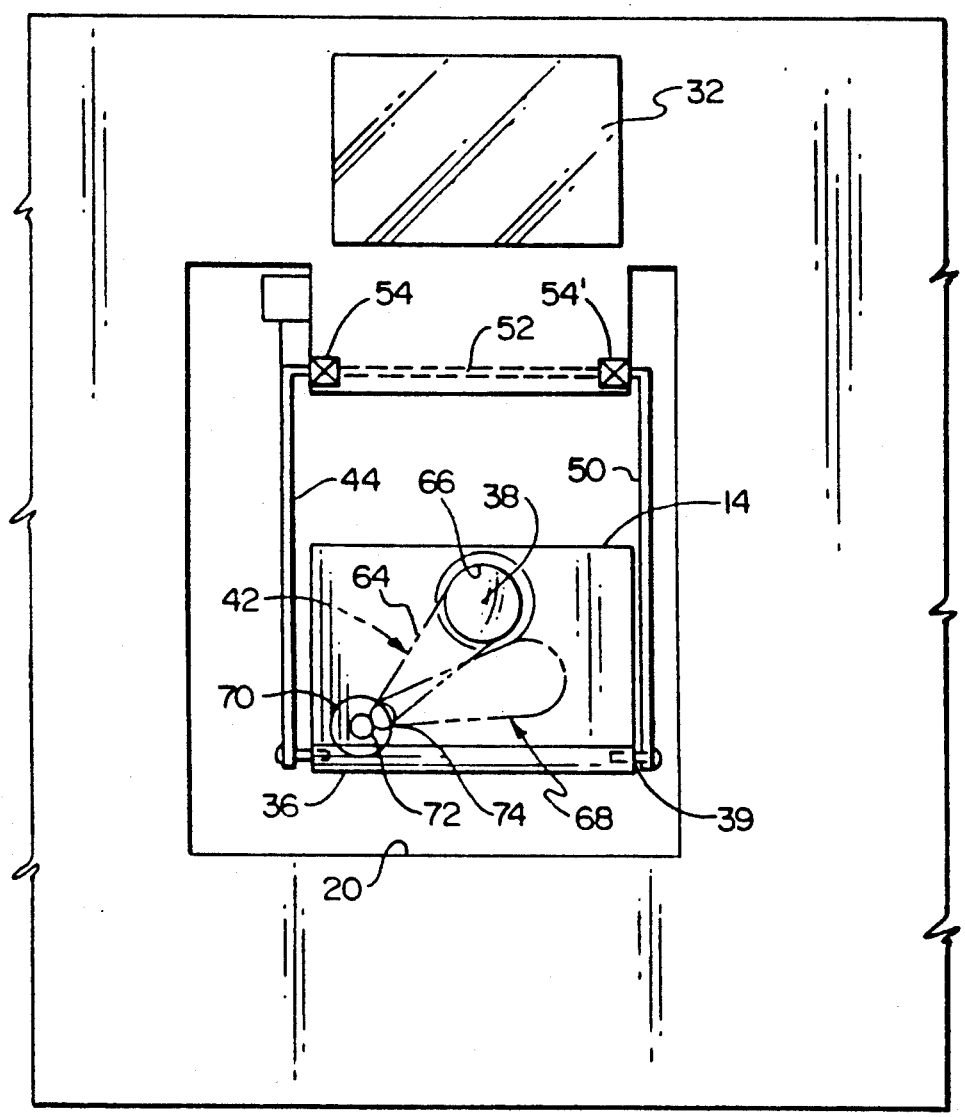
FIG. 3 is a fragmentary cross-sectional view of the deploying lens camera of the present invention, taken on line 3—3 of FIG. 2.

Deployment assembly 22 comprises a carriage 36, shaped as a simple platform, and having a first side 37 and an opposite side 39 separated by a transverse dimension, as shown in FIGS. 2 and 3. It is preferred that carriage 36 be constructed of molded, glass filled, plastic or die-cast aluminum for improved stability and reduced sensitivity to temperature change. Mounted onto carriage 36 is lens-shutter mount 14. Lens-shutter mount 14 should also be constructed of molded, glass filled, plastic or die-cast aluminum. Lens-shutter mount 14 contains an objective or taking lens 38 having an optical axis that is normal to a back wall 40 of camera housing 11. The surface of back wall 40 defines a plane over which an image recording medium, such as photographing film, can be placed. Containment and deployment of photographing film in camera 10 is accomplished by any of the well known conventional methods.

A shutter mechanism 42 is mounted onto lens-shutter mount 14, as shown in FIG. 2. Shutter mechanism 42 is an electromagnetic flip-flop shutter, the construction of which is well known in the camera art. Actuation of shutter 42 will be described herein below.

Lens deployment assembly 22 further comprises a front support leg or link 44, approximately 26 mm in length. Link 44 is pivotally connected to a camera frame 46 which forms a part of camera housing 11. A further description of the pivotal connection with camera frame 46 is provided below with reference to FIG. 3. Link 44 is also pivotally connected to first side 37 of carriage 36 by a simple pin bearing, as shown in FIG. 3. A rear support leg or link 48 has a length identical to link 44. Link 48 is also pivotally connected to camera frame 46, as later described, and to first side 37 of carriage 36 by a simple pin bearing, as indicated in FIG. 2. Rear support link 48 is spaced apart from front support link 44 by a bearing distance 49. In the preferred embodiment, bearing distance 49 is critical to the stability of carriage 36 relative to front to back tilt. The stability of objective lens 38 can be optimized by using the entire thickness dimension of storage compartment 20 for the bearing distance. In the preferred embodiment, bearing distance 49 is 15 mm.

It is also important that front and rear support links 44 and 48 have the same length, and are parallel to each other, to ensure stability of carriage 36 throughout deployment. The configuration of assembly 22, as described, ensures that the optical axis of objective lens 38 is perpendicular to back wall 40 throughout deployment of carriage 36.

A third support leg or link 50 is located across from front support link 44, as shown in FIG. 3. Link 50 is pivotally connected to camera frame 46 and to opposite side 39 of carriage 36. Support link 50 provides additional support and stability to carriage 36, and thus to objective lens 38. It is preferred that links 44, 48 and 50 be made of a metal such as brass or stainless steel.

In the preferred embodiment, support links 44 and 50 are integrally joined and configured as part of a yoke assembly 52, as shown in FIG. 3. Yoke assembly 52 includes a pair of yoke bearings 54, 54' which ensures a constant and regular pivot action from support links 44 and 50. The pivotal connection of link 48 to camera frame 46 may comprise a simple pin bearing, or it may be a connection to a pivot rod 55 suspended on a pair of bearings, as shown in FIGS. 1 and 2.

The deployment of objective lens 38 is shown in FIG. 2, in phantom lines. As indicated, deployment assembly 22 is deployed from a compact storage position 56 (shown in solid lines) by way of a deployment motor 58, using a worm gear transmission, as shown in FIG. 2. Deployment motor 58 is a low torque, high speed, motor of the type manufactured by Mabuchi, Ltd. of Japan. The worm gear transmission comprises a worm screw 60, connected to the armature of deployment motor 58, and a worm wheel 62, integrally connected to support link 48. The deployment of objective lens 38 will be described in greater detail below.

As shown in FIG. 3, shutter mechanism 42 comprises a shutter frame 64, containing a fixed shutter aperture 66, and a pivotal shutter blade 68. Shutter mechanism 42 is actuated by a reversing motor 70 through a transmission. The transmission comprises a motor gear 72, coaxially mounted to the shaft of motor 70. Motor gear 72 engages a shutter gear 74 which is connected to pivoting shutter blade 68 by a shaft 75, as shown in FIG. 2. This arrangement is well known in the camera art. Thus, further details of its construction are not given.

As shown in FIG. 2 (in phantom lines), deployment assembly 22 deploys objective lens 38 from compact storage position 56 to an operational focus position 76. Focus position 76 is the infinity focus position for camera 10. At this position, objective lens 38 sharply focuses the image of a target located at infinity. Deployment of objective lens 38 can be described with reference to a two-dimensional coordinate system (v, d) shown in FIG. 2. The v-axis represents the forward dimension and the d-axis represents the lateral dimension of the deployment path traveled by objective lens 38. At infinity focus position 76, objective lens 38 has been displaced from stored position 56 by approximately 15 mm in the forward dimension, away from back wall 40, and approximately 2 mm in the lateral dimension toward viewfinder system 12. At infinity focus position 76, objective lens 38 is located 35 mm from the film plane along the forward dimension.

It is apparent from FIG. 2 that objective lens 38 travels through an arcuate path 78 from compact storage position 56 to infinity focus position 76. Path 78 is a perfect arc, having a radius of curvature equal to the length of support links 44, 48 and 50 of assembly 22.

As shown in FIG. 2, further deployment of objective lens 38, over arcuate path 78, is achieved between infinity focus position 76 and a near focus position 80. At near focus position 80, objective lens 38 sharply focuses the image of a target located at a near field range. The near field range may be, for example, one foot. Displacement of objective lens 38 from infinity focus position 76 to near focus position 80 is approximately 3.4 mm in the lateral dimension towards viewfinder system 12, and approximately 4.5 mm in the forward dimension away from back wall 40.

The displacement in the lateral dimension affects correction of parallax occurring between viewfinder system 12 and objective lens 38. The displacement of objective lens 38 in the forward dimension affects image focusing of the target. Therefore, as objective lens 38 travels over path 78, between infinity focus position 76 and near focus position 80, focus adjustment and parallax correction is achieved simultaneously. In this arrangement, the parallax is corrected over a wide range of focus positions.

Figure 4:
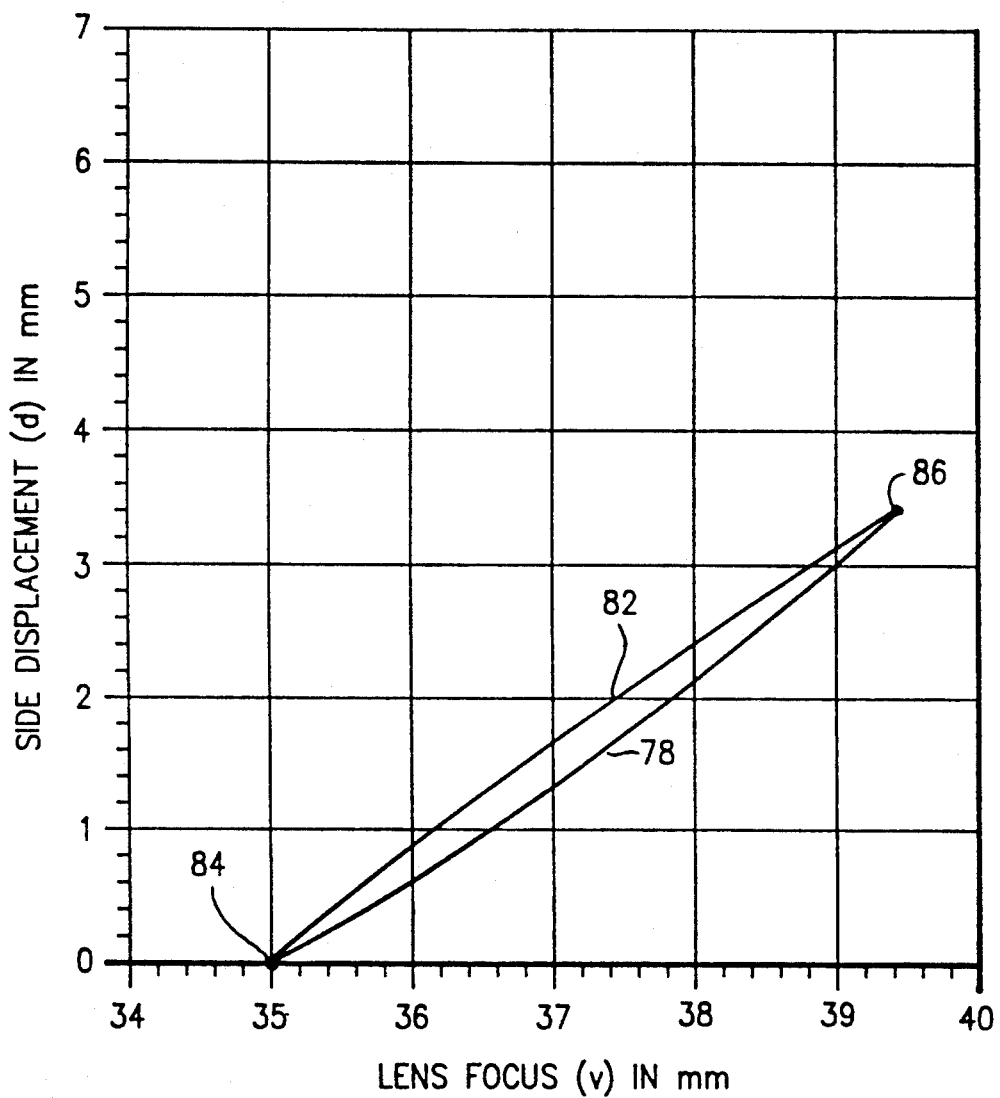
FIG. 4 is a graphic diagram showing a comparison between a theoretical lens path for both focus adjustment and parallax correction and a path of an objective lens deployed in accordance with the present invention.

Deployment path 78, between infinity focus 76 and near focus 80, has been plotted on a graph, as shown in FIG. 4. The abscissa of the graph represents lens deployment in the forward dimension, and the ordinate of the graph represents lens deployment in the lateral dimension.

The locations of the pivot connections of support links 44, 48 and 50 with camera frame 46 are selected to produce a deployment path that approximates, as closely as possible, the theoretical lens path for simultaneous focus adjustment and parallax correction. The theoretical path is determined by the following two equations:

$$d = sv/(u+v)$$

$$1/f = 1/u + 1/v$$

where f is the nominal focal length; u is the target range; s is the separation between the viewfinder axis and the objective lens axis focused at infinity; v is the displacement of the objective lens in the forward dimension; and d is the displacement of the objective lens in the lateral dimension.

As an example, the theoretical path was determined using a nominal focal length of f=35 mm and an optical axis separation of s=30 mm. The results of this calculation are shown in the following table.

| f in mm | s in mm | u in ft | v in mm | d |
|---|---|---|---|---|
| 35 | 30 | 100000 | 35.00004 | 0.00003 |
| 35 | 30 | 100 | 35.04024 | 0.03445 |
| 35 | 30 | 52 | 35.08057 | 0.06890 |
| 35 | 30 | 20 | 35.20211 | 0.17224 |
| 35 | 30 | 10 | 35.40657 | 0.34449 |
| 35 | 30 | 5 | 35.82270 | 0.68898 |
| 35 | 30 | 4 | 36.03445 | 0.86122 |
| 35 | 30 | 3 | 36.39300 | 1.14829 |
| 35 | 30 | 2 | 37.13192 | 1.72244 |
| 35 | 30 | 1.5 | 37.90147 | 2.29659 |
| 35 | 30 | 1 | 39.54040 | 3.44488 |

A plot 82 of the theoretical path is shown in FIG. 4. Plot 82 includes an infinity focus position 84 and a near field (e.g., 1 ft) focus position 86. In FIG. 4, theoretical plot 82 is compared with deployment path 78. Deployment path 78 can be shifted or tilted about theoretical path 82 by adjusting the locations of the pivotal connections of support links 44, 48 and 50 to camera frame 46. For example, it may be beneficial to shift the deployment path toward theoretical plot 82 to avoid the relatively large errors occurring in the central portion of path 78, as shown in FIG. 4. Furthermore, the curvature of path 78, can be changed by increasing or decreasing length of the support links 44, 48 and 50.

Deployment assembly 22 has an advantage over guide-rod deployment systems, such as used in the Konica A4 camera, in that it permits a compact camera housing design. In the present invention, the entire deployment assembly is retracted into compact storage compartment 20. Thus, the camera thickness can be reduced without imposing a limitation on the deployment distance, unlike in guide-rod deployment systems. Moreover, the height dimension of camera housing 11 can be reduced because deployment assembly 22 retracts along an arcuate path to its storage position. In contrast, a guide-rod deployment system, used for correcting parallax and focusing, retracts from an operational position along an inclined straight-line path. Such an arrangement requires a significant extension of the storage compartment in the height dimension of the camera housing.

As shown in FIG. 2, the deployment of assembly 22 is controlled by motor control circuit 26. Motor control circuit 26 is energized by a battery power supply when ON/OFF switch 28 is closed. At the moment of energization, control circuit 26 generates a control signal over a circuit connection 102 to cause deployment motor 58 to drive assembly 22 from storage position 56 to infinity focus position 76.

Control circuit 26 also contains an encoder which operates on a range signal received from range finder 25. Range finder 25 is an infra red triangulation range finder. It focuses an infra red beam 103 onto the target and receives a reflected infra red beam 104 from the target. Beam 103 is emitted through an aperture which is spatially separated from a second aperture through which reflected beam 104 is received. A position sensitive device, within range finder 25, detects the displacement of reflected beam 104 and produces a signal from which the range of the target is determined. Infra red range finders are well known in the camera art, and therefore further detail of operation is not provided.

As shown in FIGS. 1 and 2, range finder 25 is activated by shutter release button 24. The output of range finder 25 is a range signal, representing the distance between the target and the objective lens 38. The range signal is received by control circuit 26 from a circuit connection 106. The encoder of control circuit 26 determines, from the range signal, the necessary control information for deploying objective lens 38 to the proper focus and parallax correction position.

After control circuit 26 receives the range signal from range finder 25, it generates a control signal, which is received by deployment motor 58. The control signal causes deployment motor 58 to turn worm screw 60 and thus actuate assembly 22 through worm gear wheel 62. Deployment of assembly 22 is monitored by an electro-optical system, comprising an optical interrupter device 108 which is electrically connected to control circuit 26 by a circuit connection 110.

Optical interrupter 108 comprises an LED emitter and a photodiode detector. The LED produces a beam of light which is continuously detected by the photodiode. If the beam of light is interrupted, the signal produced by the photodiode is, in turn, interrupted, producing a negative signal transition. This signal transition is detected by control circuit 26.

As shown in FIG. 2, the beam is interrupted by a chopper wheel 112, which is coaxially mounted to worm screw 60. Chopper wheel 112 has eight chopper blades. From this arrangement, revolutions, and every one-eight of a revolution, of worm screw 60 can be counted and recorded by control circuit 26.

The encoder of control circuit 26 determines from the range signal, received from range finder 25, the correct deployment position of objective lens 38. This may be accomplished, for example, by a look-up table. The position is then stored for later comparison purposes. The encoder also determines from the count of worm screw revolutions (and fractions of a revolution) the actual instantaneous deployment position of objective lens 38. This determination may also be accomplished by a look-up table. The instantaneous deployment position value is repeatedly compared to the stored deployment position value. When these two values are equal, motor control circuit 26 deactivates deployment motor 58 to stop actual deployment of objective lens 38. Under this condition, motor control circuit 26 also generates an in-focus signal over a circuit connection 114.

The in-focus signal may be in the form of a trigger pulse that causes shutter drive circuit 27 to generate a control signal which is conducted along a circuit connection 118 to shutter motor 70. This control signal activates shutter motor 70, causing shutter mechanism 42 to operate through the transmission of motor gear 72 and shutter gear 74. Shutter drive circuit 27 can be configured as a monostable multivibrator, which triggers on the in-focus signal. As is well known, operation of shutter mechanism 42 permits the taking of a photograph by camera 10.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A camera for photographing a target image, having a camera housing containing a back wall and a viewfinder system, a deployment assembly, and an objective lens mounted to said deployment assembly, said deployment assembly comprising a carriage, to which said objective lens is mounted, having a first side and an opposite side separated by a transverse dimension;

a rear support leg, having a predetermined length, and being pivotally connected to said camera housing at a proximal end and to the first side of said carriage at a distal end; and a front support leg, having substantially the same length as said rear support leg, and being pivotally connected to said camera housing at a proximal end and to the first side of said carriage at a distal end, the respective pivotal connections of said front support leg and said rear support leg to said carriage being spaced apart by a predetermined bearing distance;

whereby said objective lens is deployable through an arcuate path between a compact storage position and an operational position.

2. A camera as recited in claim 1, wherein the operational position of said objective lens is an infinity focus position, whereby the image of a target at infinity can be focused onto an image recording medium located in said camera housing.

3. A camera as recited in claim 1, wherein the operational position of said objective lens is a near focus position, whereby the image of a target at a near range can be focused onto an image recording medium located in said camera housing.

4. A camera for photographing a target image, comprising a camera housing containing a back wall and a viewfinder system;

a deployable objective lens having an optical axis, said objective lens being spaced apart from said viewfinder system in at least a lateral dimension and from said back wall in at least a forward dimension; and means, supported by said camera housing, for deploying said objective lens through an arcuate path between a storage position and a plurality of operational focus positions, said objective lens being mounted to said deployment means, each of the plurality of operational focus positions being spaced apart from the storage position by a distance in the lateral dimension toward said viewfinder system and a distance in the forward dimension away from said back wall, the optical axis of said objective lens being substantially normal to said back wall during deployment of said lens through said operational focus positions.

5. A camera as recited in claim 4, wherein the plurality of operational focus positions of said objective lens includes an infinity focus position and a near focus position, the near focus position being spaced apart from the infinity focus position by a distance in the lateral dimension towards said viewfinder system and by a distance in the forward dimension away from said back wall, whereby parallax correction and focus adjustment are achieved simultaneously for target ranges between infinity and a predetermined near field.

6. A camera as recited in claim 5, wherein said deployment means is position, configured and dimensioned to produce an arcuate deployment path between the infinity focus position and the near focus position which approximates the theoretical path for simultaneous parallax correction and focus adjustment.

7. A camera as recited in claim 6 wherein said deployment means includes a carriage, to which said objective lens is mounted, having a first side and an opposite side separated by a transverse dimension;

a rear support leg, having a predetermined length, and being pivotally connected to said camera housing at a proximal end and to the first side of said carriage at a distal end; and a front support leg, having substantially the same length as said rear support leg, and being pivotally connected to said camera housing at a proximal end and to the first side of said carriage at a distal end, said front support leg being spaced apart from said rear support leg by a predetermined bearing distance in the forward dimension;

whereby said arcuate deployment path has a radius of curvature equal to the length of said front and said rear support legs.

8. A camera as recited in claim 7, wherein said deployment means further includes a third support leg, having substantially the same length as said front support leg, and being pivotally connected to said camera housing at a proximal end and to the opposite side of said carriage at a distal end, said third support leg being disposed in opposing relation to said front support leg and spaced apart by the transverse dimension of said carriage.

9. A camera as recited in claim 8, further comprising means, coupled to said deployment means, for actuating said deployment means.

10. A camera as recited in claim 9, wherein said actuation means comprises a deployment motor, having a rotatable worm screw attached thereto;

said rear support leg of said deployment means has a worm wheel connected to its proximal end; and said actuation means is coupled to said deployment means by the engagement of the rotatable worm screw of said deployment motor and the worm wheel of said support leg.

11. A camera as recited in claim 10, further comprising means for finding the range of a target and generating a range signal representative of the range found; and means, connected to both said actuation means and said range finder means, for controlling said actuation means in response to the range signal generated by said range finder means.

12. A camera as recited in claim 10, wherein said viewfinder system is a fixed viewfinder system.

13. A camera as recited in claim 10, wherein said camera housing further contains a compact storage compartment in which said objective lens resides when in said storage position.

14. A camera as recited in claim 11, further comprising means, coupled to said actuation means, for generating a position signal representative of the position of said deployment means, said control means being further connected to said generating means for controlling said actuation means in response to both the range signal generated by said range finder means and the position signal generated by said generating means.

15. A camera as recited in claim 11, wherein said control means is energized by a power supply upon the closing of an ON/OFF switch and, upon energization, said control means causes said deployment means to deploy said objective lens from the storage position to the infinity focus position.

16. A camera as recited in claim 14, wherein said control means generates an in-focus signal when said objective lens is in position to focus the target onto an image recording medium, as determined from both the range signal of said range finder means and the position signal of said generating means; and means, connected to said control means, for actuating a shutter mechanism of said camera in response to the in-focus signal generated by said control means.

17. A method of deploying an objective lens of a camera having a fixed viewfinder system, comprising the steps of supporting said objective lens in a lens mount that is pivotally connected to a frame of said camera; and pivoting said lens mount about its pivotal connection to the frame of said camera, toward said viewfinder, such that said objective lens is deployable over an arcuate path from a compact storage position through a range of operational focus positions.

18. A method as recited in claim 17, wherein said range of operational focus positions is between an infinity focus position and a predetermined near focus position.

* * * * *